(12) United States Patent
Huang et al.

(10) Patent No.: US 7,701,649 B2
(45) Date of Patent: Apr. 20, 2010

(54) FIXED-FOCUS LENS

(75) Inventors: Huai-Yi Huang, Hsinchu (TW); Jung-Yao Chen, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 92 days.

(21) Appl. No.: 12/053,290

(22) Filed: Mar. 21, 2008

(65) Prior Publication Data

US 2009/0067064 A1 Mar. 12, 2009

(30) Foreign Application Priority Data

Sep. 11, 2007 (TW) .............................. 96133817 A

(51) Int. Cl.
*G02B 9/00* (2006.01)
(52) U.S. Cl. ...................... 359/754; 359/756
(58) Field of Classification Search ................ 359/754, 359/752, 691, 756
See application file for complete search history.

(56) References Cited

U.S. PATENT DOCUMENTS

| | | | |
|---|---|---|---|
| 5,666,228 A * | 9/1997 | Yamamoto | 359/651 |
| 6,747,814 B2 | 6/2004 | Abe | |
| 6,801,373 B2 * | 10/2004 | Reinecke et al. | 359/754 |
| 6,825,993 B2 | 11/2004 | Noda | |
| 6,853,495 B2 | 2/2005 | Kondo et al. | |
| 6,870,692 B2 | 3/2005 | Tsuchida | |
| 6,924,947 B2 | 8/2005 | Saori | |
| 7,180,687 B2 | 2/2007 | Sato | |
| 7,286,302 B2 * | 10/2007 | Ohzawa et al. | 359/749 |
| 2006/0087747 A1 * | 4/2006 | Ohzawa et al. | 359/749 |
| 2006/0274433 A1 * | 12/2006 | Kamo | 359/793 |
| 2007/0206295 A1 * | 9/2007 | Yamashita et al. | 359/717 |

FOREIGN PATENT DOCUMENTS

| | | |
|---|---|---|
| CN | 1782744 A | 6/2006 |
| JP | 2001-281540 | 10/2001 |

OTHER PUBLICATIONS

Chinese First Examination Report of China Application No. 2007101698684, dated Sep. 4, 2009.

* cited by examiner

*Primary Examiner*—Joseph Martinez
*Assistant Examiner*—James R Greece
(74) *Attorney, Agent, or Firm*—J.C. Patents

(57) ABSTRACT

A fixed-focus lens including a first lens group and a second lens group is provided. The first lens group has a negative refractive power, and consists essentially of a first lens, a second lens, a third lens, and a fourth lens arranged in sequence from an object side to an image side. Refractive powers of the first, second, third, and fourth lenses are negative, negative, positive, and negative respectively. The second lens group is disposed between the first lens group and the image side, and has a positive refractive power. The second lens group includes a fifth lens and a sixth lens arranged in sequence from the object side to the image side. Refractive powers of the fifth lens and the sixth lens are both positive.

7 Claims, 5 Drawing Sheets

US 7,701,649 B2

FIXED-FOCUS LENS

CROSS-REFERENCE TO RELATED APPLICATION

This application claims the priority benefit of Taiwan application serial no. 96133817, filed on Sep. 11, 2007. The entirety of the above-mentioned patent application is hereby incorporated by reference herein and made a part of this specification.

BACKGROUND OF THE INVENTION

1. Field of the Invention

The present invention relates to a lens. More particularly, the present invention relates to a fixed-focus lens.

2. Description of Related Art

With the development of modern video technology, image apparatuses such as digital video cameras (DVC) and digital cameras (DC) are widely used in a variety of fields. One of the core elements of the image apparatuses is lens, which is used for forming clear images on a screen or a charge coupled device (CCD). When the image apparatuses are applied in some specific fields, wide angle lenses are used to widen the field of view (FOV). For example, the wide angle lenses are used in car reverse cameras or driving assist cameras. Generally speaking, the horizontal FOV of wide angle lenses for cars is about 100 degrees. In addition, the f-number of normal wide angle lenses for cars is about 2.8. Furthermore, the length and volume of wide angle lenses for cars must be small enough to be mounted in bumpers or at other positions of the cars.

Referring to FIG. 1, a wide angle lens 100 disclosed in U.S. Pat. No. 6,853,495 includes two lens groups 110 and 120 arranged in sequence from an object side to an image side. The refractive powers of the two lens groups 110 and 120 are negative and positive, respectively. The lens group 110 consists of two lenses 112 and 114. The refractive powers of the lenses 112 and 114 are both negative, and the lens 114 is an aspheric lens. The lens group 120 consists of five lenses 121, 122, 123, 124, and 125, and the refractive powers of the five lenses 121, 122, 123, 124, and 125 are negative, positive, positive, positive, and negative, respectively. As the wide angle lens 100 has an aspheric lens (i.e. the lens 114) that requires high manufacturing cost, the cost of the wide angle lens 100 is high. Moreover, the wide angle lens 100 has seven lenses 112, 114, 121, 122, 123, 124, and 125 altogether, so that the length and the volume of the wide angle lens 100 are relatively great.

SUMMARY OF THE INVENTION

The present invention is directed to a fixed-focus lens, which has a wide FOV, small f-number, small volume, and short length.

An embodiment of the present invention provides a fixed-focus lens including a first lens group and a second lens group. The first lens group has a negative refractive power, and consists essentially of a first lens, a second lens, a third lens, and a fourth lens arranged in sequence from an object side to an image side. Refractive powers of the first, second, third, and fourth lenses are negative, negative, positive, and negative, respectively. The second lens group is disposed between the first lens group and the image side, and has a positive refractive power. The second lens group includes a fifth lens and a sixth lens arranged in sequence from the object side to the image side. Refractive powers of the fifth lens and the sixth lens are both positive.

As the fixed-focus lens may have only six lenses, the length and volume of the fixed-focus lens are small enough to be used in car cameras. In addition, the fixed-focus lens has wider FOV, the horizontal FOV may exceed 130 degrees, and the FOV in a diagonal direction may be approximate to 180 degrees.

Other objectives, features and advantages of the present invention will be further understood from the further technological features disclosed by the embodiments of the present invention wherein there are shown and described preferred embodiments of this invention, simply by way of illustration of modes best suited to carry out the invention.

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
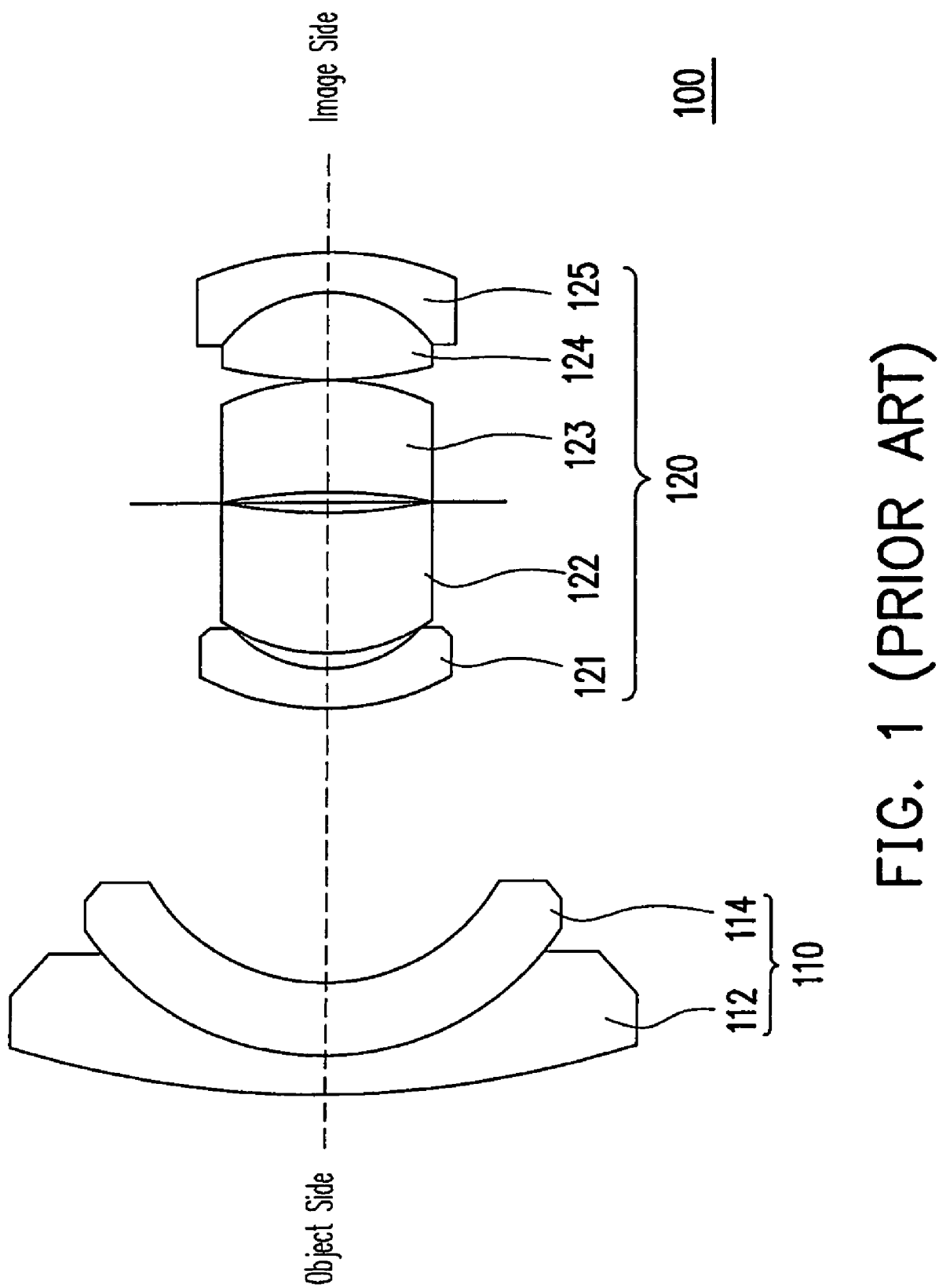
FIG. 1 is a schematic structural view of a conventional wide angle lens.
Figure 2:
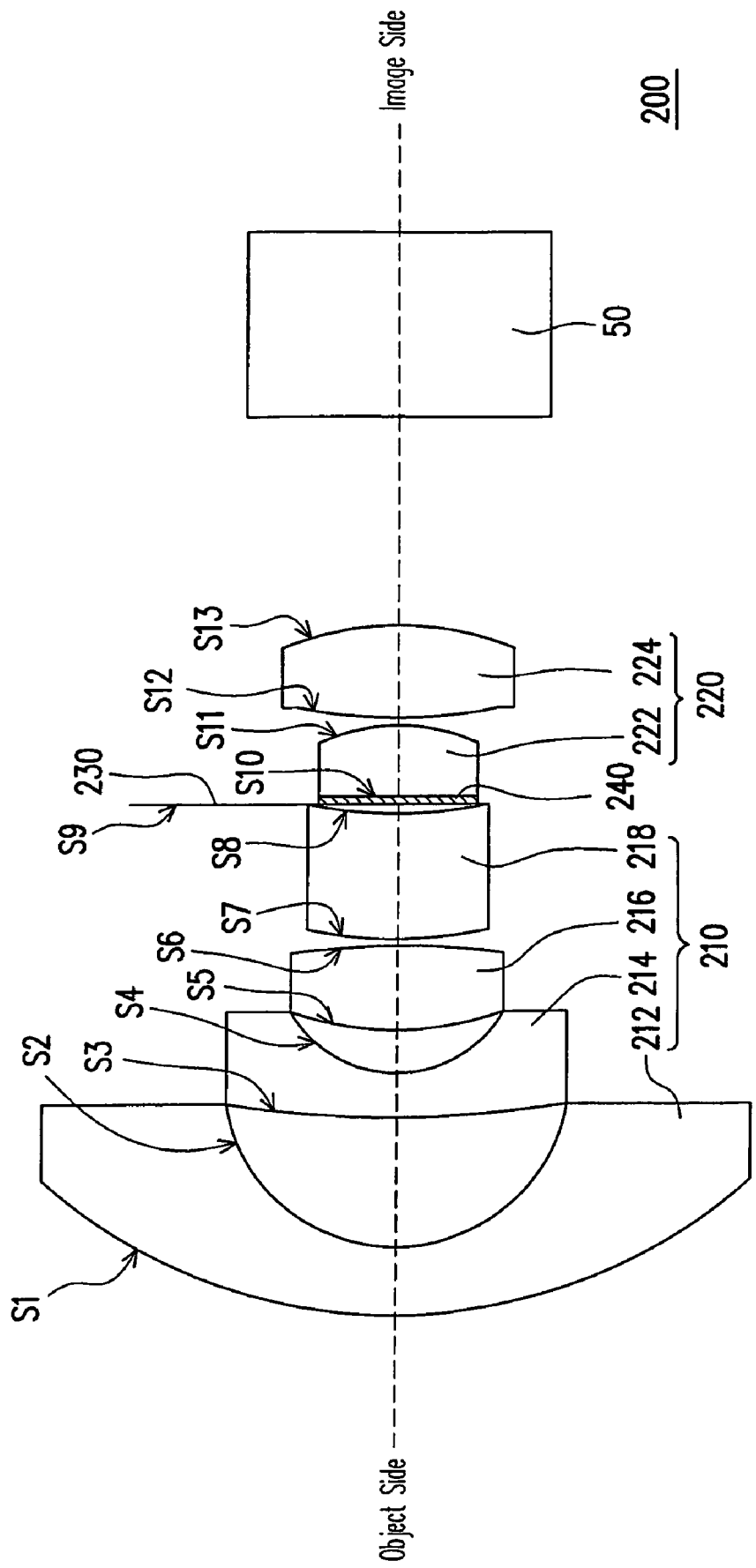
FIG. 2 is a schematic structural view of a fixed-focus lens according to an embodiment of the present invention.

Referring to FIG. 2, a fixed-focus lens 200 according to an embodiment of the present invention includes a first lens group 210 and a second lens group 220. The first lens group 210 has a negative refractive power, and consists essentially of a first lens 212, a second lens 214, a third lens 216, and a fourth lens 218 arranged in sequence from an object side to an image side. Refractive powers of the first, second, third, and fourth lenses 212, 214, 216, and 218 are negative, negative, positive, and negative, respectively. In this embodiment, the first, second, third, and fourth lenses 212, 214, 216, and 218 are, for example, a convex-concave lens with a convex surface facing the object side, a convex-concave lens with a convex surface facing the object side, a biconvex lens, and a convex-concave lens with a convex surface facing the object side, respectively.

The second lens group 220 is disposed between the first lens group 210 and the image side, and has a positive refractive power. The second lens group 220 includes a fifth lens 222 and a sixth lens 224 arranged in sequence from the object side to the image side. Refractive powers of the fifth lens 222 and the sixth lens 224 are both positive. In this embodiment, the fifth lens 222 and the sixth lens 224 are, for example, a plano-convex lens with a convex surface facing the image side and a biconvex lens, respectively. Moreover, the first, second, third, fourth, fifth, and sixth lenses 212, 214, 216, 218, 222, and 224 may all be spherical lenses, and the materials of the lenses are, for example, glass, plastic, or other light transmissive materials.

Generally speaking, a photosensitive element 50 may be disposed on the image side to sense images from the object side. In this embodiment of the present invention, the photosensitive element 50 is, for example, a charge coupled device (CCD) or a complementary metal oxide semiconductor sensor (CMOS sensor). However, in other embodiments of the present invention, the photosensitive element 50 may also be a film or other appropriate photosensitive elements. In this embodiment, the fixed-focus lens 200 may further include an aperture stop 230 disposed between the first lens group 210 and the second lens group 220, i.e., between the fourth lens 218 and the fifth lens 222.

As the fixed-focus lens 200 may have only six lenses (i.e., the first, second, third, fourth, fifth, and sixth lenses 212, 214, 216, 218, 222, and 224), the fixed-focus lens 200 has a short length and a small volume, and satisfies the application in the car cameras. Therefore, the fixed-focus lens 200 may be mounted in bumpers or at other positions of the cars. In addition, the fixed-focus lens 200 has wide FOV, the horizontal FOV may exceed 130 degrees, and the FOV in a diagonal direction may be approximate to 180 degrees. Thus, the viewing angle while reversing or driving the car is wider. In other words, the fixed-focus lens 200 may be a wide angle lens. In addition, the f-number of the fixed-focus lens 200 may be as small as 2.0, thus admitting more light into the lens, so that the fixed-focus lens 200 can be used in a dark environment. Furthermore, the fixed-focus lens 200 may use no aspheric lens and achieves the advantages of small volume and short length, and thus the cost of the fixed-focus lens 200 is low.

In this embodiment, the first lens 212 rests on the second lens 214, and the second lens 214 rests on the third lens 216. In addition, the fourth lens 218 may rest on the aperture stop 230, and the aperture stop 230 may rest on the fifth lens 222. In other words, it is unnecessary to dispose spacers between the first, second, and third lenses 212, 214, and 216, and between the fourth lens 218, the aperture stop 230, and the fifth lens 222, such that the length and volume of the fixed-focus lens 200 are further reduced, and the number of the spacers is reduced, thereby reducing the cost.

In this embodiment, except an IR-cut filter may be disposed between the second lens group 220 and the photosensitive element 50 for filtering infrared light from the object side, a surface S10 of the fifth lens 222 of the fixed-focus lens 200 may be a plane surface facing the object surface, and an infrared-cut film (IR-cut film) 240 may be disposed on the plane surface. The IR-cut film 240 may be, for example, coated on the surface S10 by means of coating. The IR-cut film 240 may filter the infrared light from the object side, such that the photosensitive element 50 shows natural colors. The fixed-focus lens 200 uses the IR-cut film 240 disposed on the surface S10 of the lens and occupying less space to replace the IR-cut filter that occupies more space, such that the length and volume of the fixed-focus lens 200 may be further reduced.

Hereinafter, preferred parameters of the fixed-focus lens 200 will be illustrated. The data listed below does not intend to limit the scope of the present invention. Persons skilled in the art can make alternations on the parameters or settings with reference to the present invention, which are still fall within the scope of the present invention.

TABLE 1

| Surface | Radius of Curvature (mm) | Interval (mm) | Refractive Index | Abbe number | Remarks |
|---|---|---|---|---|---|
| S1 | 8.54 | 1.16 | 1.696797 | 55.532245 | First Lens |
| S2 | 2.84 | 2.11 | | | |
| S3 | 36.13 | 0.7 | 1.696797 | 55.532245 | Second Lens |
| S4 | 2.02 | 0.74 | | | |
| S5 | 7.15 | 1.3 | 1.84666 | 23.779785 | Third Lens |
| S6 | −14.64 | 0.1 | | | |
| S7 | 6.67 | 2.13 | 1.84666 | 23.779785 | Fourth Lens |
| S8 | 4.77 | 0.07 | | | |
| S9 | Infinity | 0.027 | | | Aperture Stop |
| S10 | Infinity | 1.2 | 1.696797 | 55.532245 | Fifth Lens |
| S11 | −2.95 | 0.1 | | | |
| S12 | 6.07 | 1.5 | 1.603001 | 65.443648 | Sixth Lens |
| S13 | −6.07 | 3.27 | | | |

In Table 1, the radius of curvature (mm) is the radius curvature of each surface, and the interval (mm) refers to the straight distance between two neighboring surfaces on a main axis. For example, the interval of the surface S1 is the straight distance from the surface S1 to the surface S2 on the main axis. The thickness, refractive index, and Abbe number of each lens in the Remarks field are the corresponding values of the thickness, refractive index, and Abbe number in the same row. In addition, in Table 1, the surfaces S1 and S2 are two surfaces of the first lens 212. The surfaces S3 and S4 are two surfaces of the second lens 214. The surfaces S5 and S6 are two surfaces of the third lens 216. The surfaces S7 and S8 are two surfaces of the fourth lens 218. The surface S9 is a surface of the aperture stop 230. The surfaces S10 and S11 are two surfaces of the fifth lens 222. The surfaces S12 and S13 are two surfaces of the sixth lens 224. The interval filled in the row of the surface S13 is the distance from the surface 13 to a surface of the photosensitive element facing the object side. Parameters of the radius of curvature, intervals, and so on of all the surfaces are listed in Table 1, and will not be repeated herein.

The fixed-focus lens 200 has good imaging quality, which will be verified with optical simulation data below.

Figure 3A:
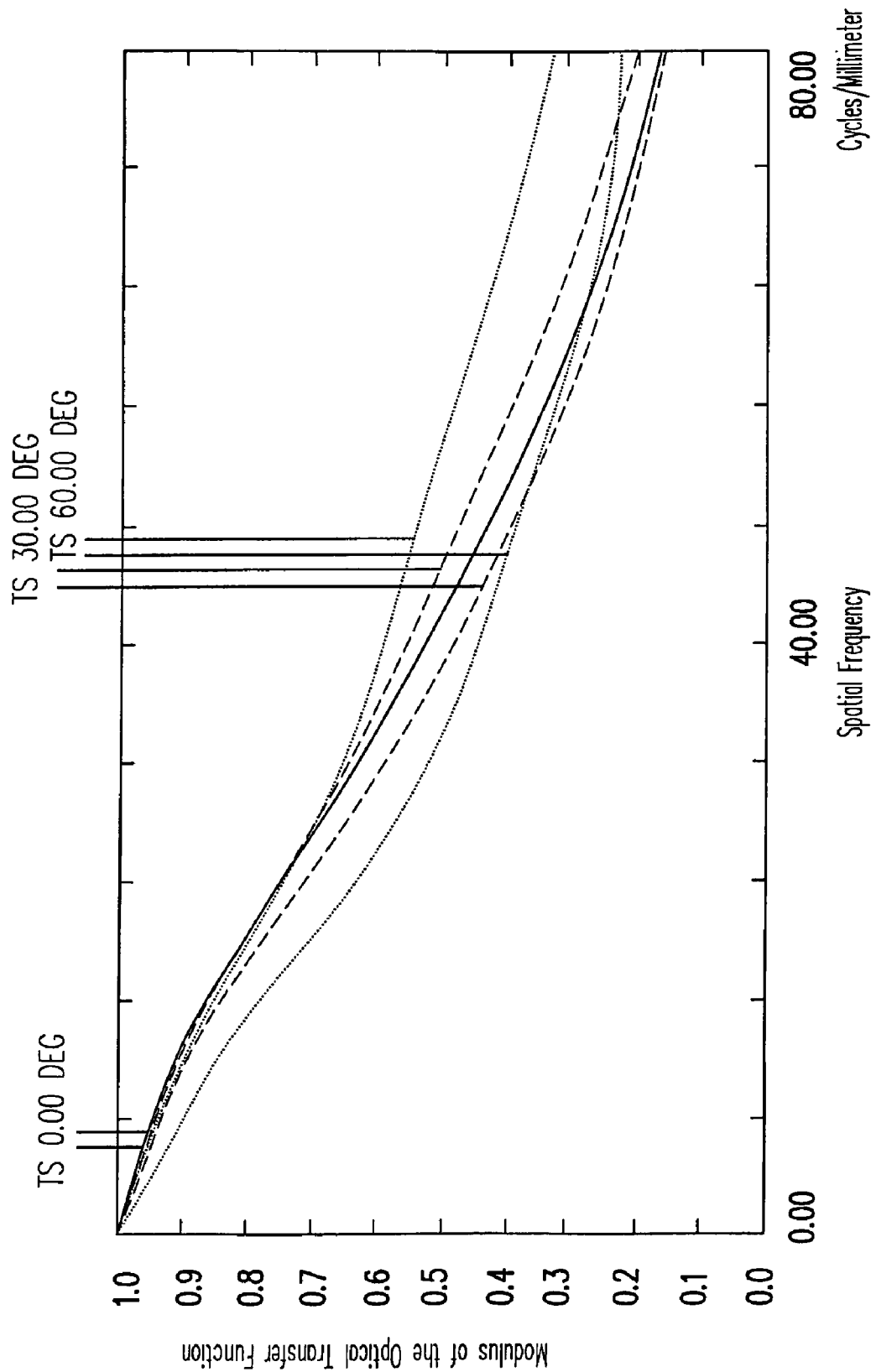
FIGS. 3A to 3C are diagrams showing optical simulation data of imaging of the fixed-focus lens in FIG. 2.
Figure 3B:
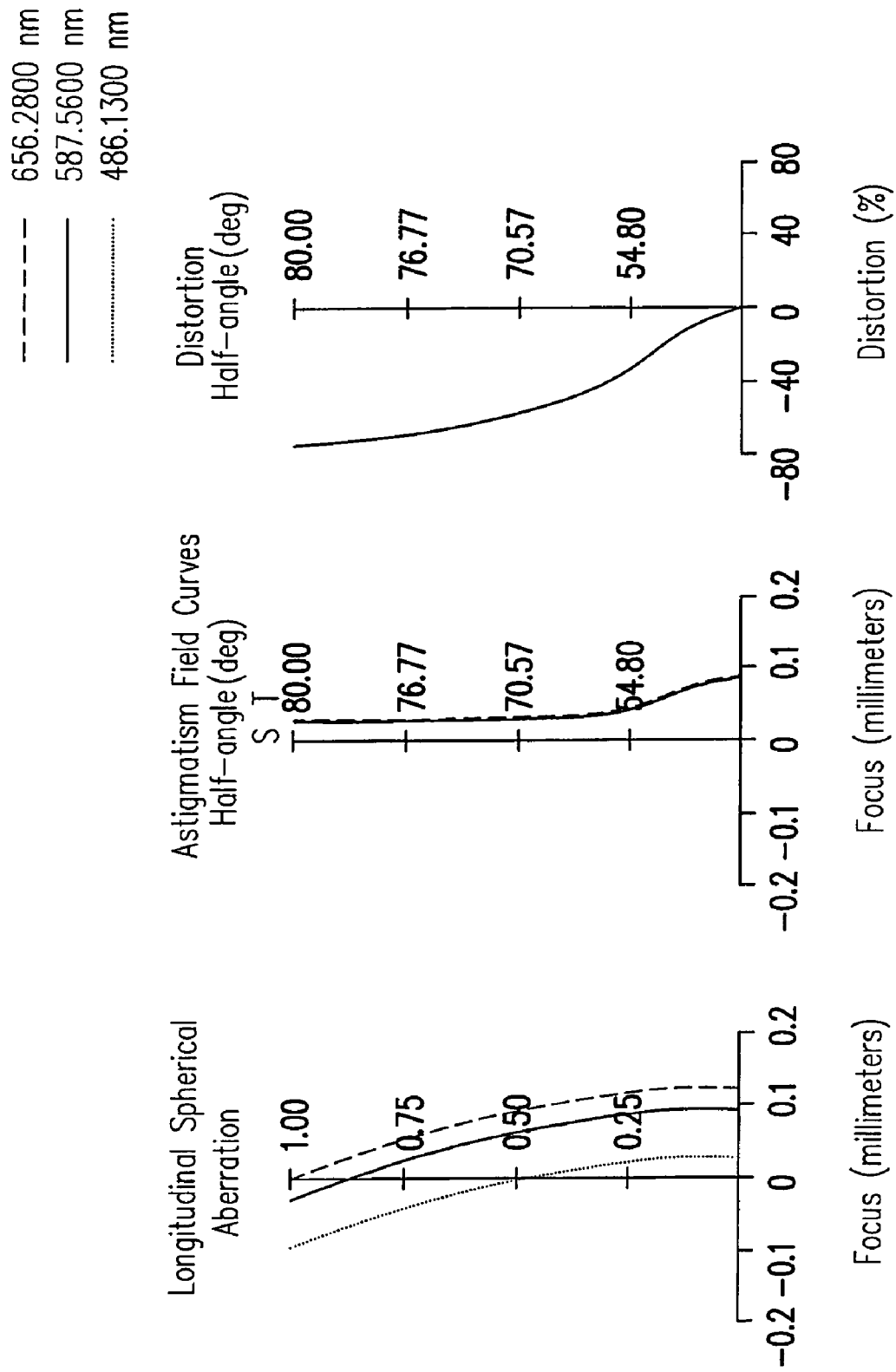
Figure 3C:
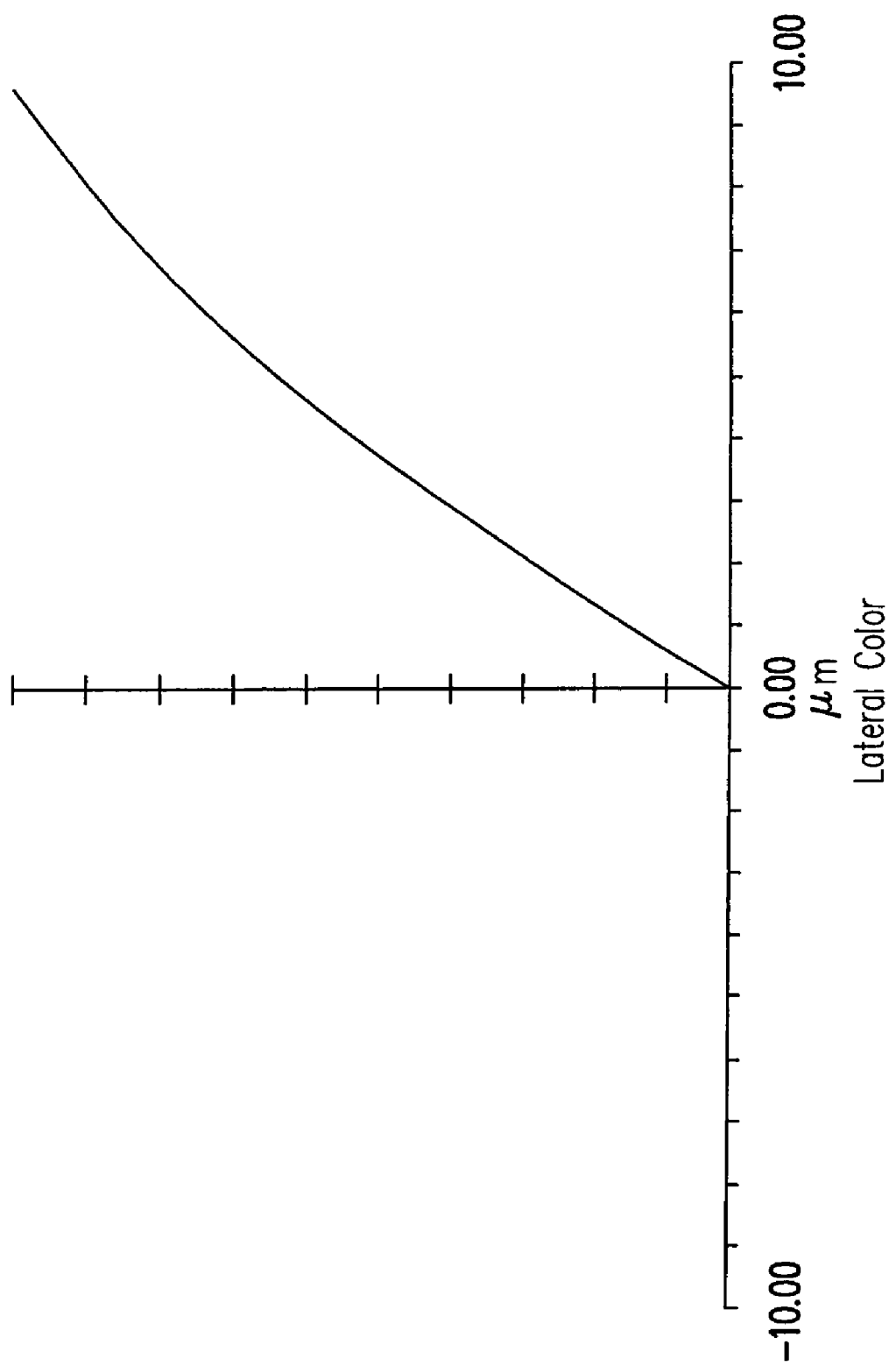

FIGS. 3A to 3C are diagrams showing optical simulation data of imaging of the fixed-focus lens in FIG. 2. Referring to FIGS. 3A to 3C, FIG. 3A is a curve diagram of modulation transfer function (MTF), in which the transverse axis is the spatial frequency in cycles per millimeter, and the vertical axis is the modulus of the optical transfer function (modulus of the OTF). FIG. 3B shows graphics of longitudinal spherical aberration, astigmatism field curves, and distortion respectively from left to right. FIG. 3C is a diagram of lateral color of images, and the maximum field in FIG. 3C is 80.0000 degrees. As described above, the graphics in FIGS. 3A to 3C fall within standard ranges, so that the fixed-focus lens 200 of this embodiment has good imaging quality.

To sum up, as the fixed-focus lens may have only six lenses, the length and volume of the fixed-focus lens are small enough to satisfy the application in car cameras, so that the fixed-focus lens may be mounted in bumpers or at other positions of the cars. Furthermore, the fixed-focus lens has wide FOV, the horizontal FOV may exceed 130 degrees, and the FOV in a diagonal direction may be approximate to 180 degrees. Thus, the viewind angle while driving or reversing a car is wider. In addition, the f-number of the fixed-focus lens may be as small as 2.0, thus admitting more light into the lens, such that the fixed-focus lens 200 may be used in a dark environment. Furthermore, the fixed-focus lens may use no aspheric lens and achieves the advantages of small volume and short length, so that the cost of the fixed-focus lens is low. Moreover, the fixed-focus lens may use the IR-cut film disposed on the surface of the lens and occupying small space to replace the IR-cut filter in the conventional art that occupies more space, so that the length and volume of the fixed-focus lens may be further reduced.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A fixed-focus lens, comprising:
   a first lens group, having a negative refractive power and consisting essentially of a first lens, a second lens, a third lens, and a fourth lens arranged in sequence from an object side to an image side, wherein refractive powers of the first, second, third, and fourth lenses are negative, negative, positive, and negative respectively;
   a second lens group, disposed between the first lens group and the image side and having a positive refractive power, the second lens group comprising a fifth lens and a sixth lens arranged in sequence from the object side to the image side, wherein refractive powers of the fifth lens and the sixth lens are both positive; and
   an aperture stop disposed between the first lens group and the second lens group, wherein the fourth lens rests on the aperture stop, and the aperture stop rests on the fifth lens.

2. The fixed-focus lens as claimed in claim 1, wherein the fifth lens has a plane surface facing the object side, and the fixed-focus lens further comprises an infrared-cut film disposed on the plane surface.

3. The fixed-focus lens as claimed in claim 1, wherein the first lens rests on the second lens, and the second lens rests on the third lens.

4. The fixed-focus lens as claimed in claim 1, wherein the first, second, third, and fourth lenses are a convex-concave lens with a convex surface facing the object side, a convex-concave lens with a convex surface facing the object side, a biconvex lens, and a convex-concave lens with a convex surface facing the object side respectively.

5. The fixed-focus lens as claimed in claim 1, wherein the fifth lens and the sixth lens are a plano-convex lens with a convex surface facing the image side and a biconvex lens respectively.

6. The fixed-focus lens as claimed in claim 1, wherein the first, second, third, fourth, fifth, and sixth lenses are all spherical lenses.

7. The fixed-focus lens as claimed in claim 1, wherein materials of the first, second, third, fourth, fifth, and sixth lenses comprise glass or plastic.

* * * * *